Figures 1, 2:
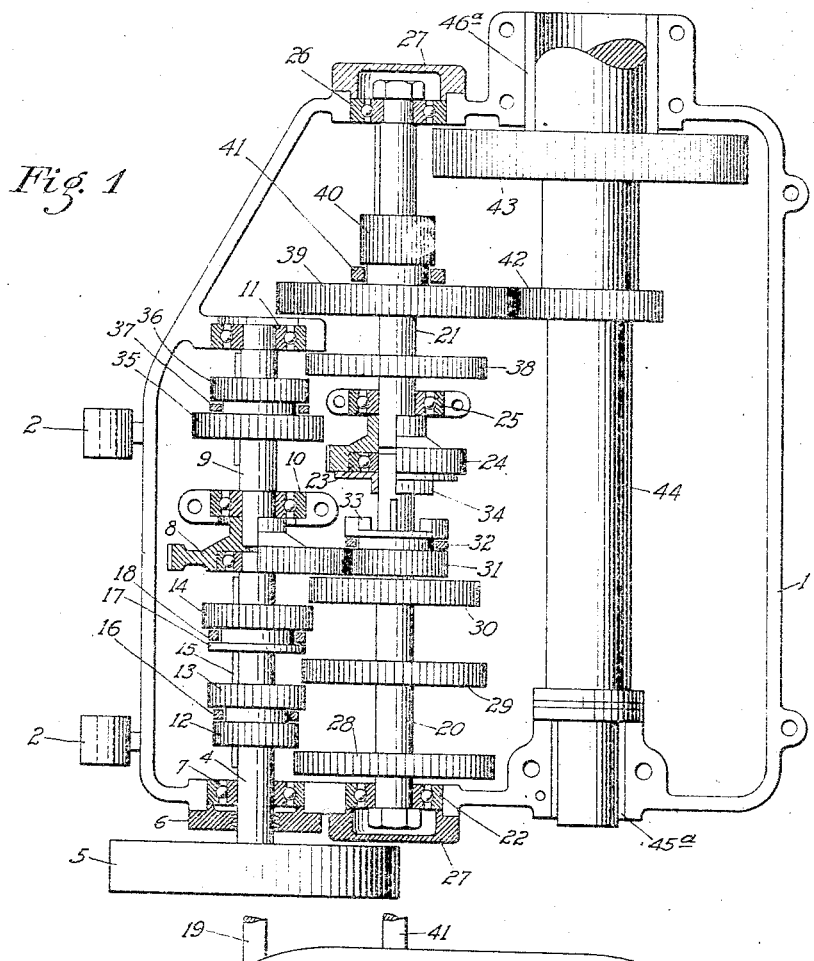

M. E. DEWSTOE.
VARIABLE SPEED GEAR DRIVING MECHANISM.
APPLICATION FILED MAR. 13, 1915.

1,158,990.

Patented Nov. 2, 1915.
2 SHEETS—SHEET 1.

Inventor
M. E. Dewstoe

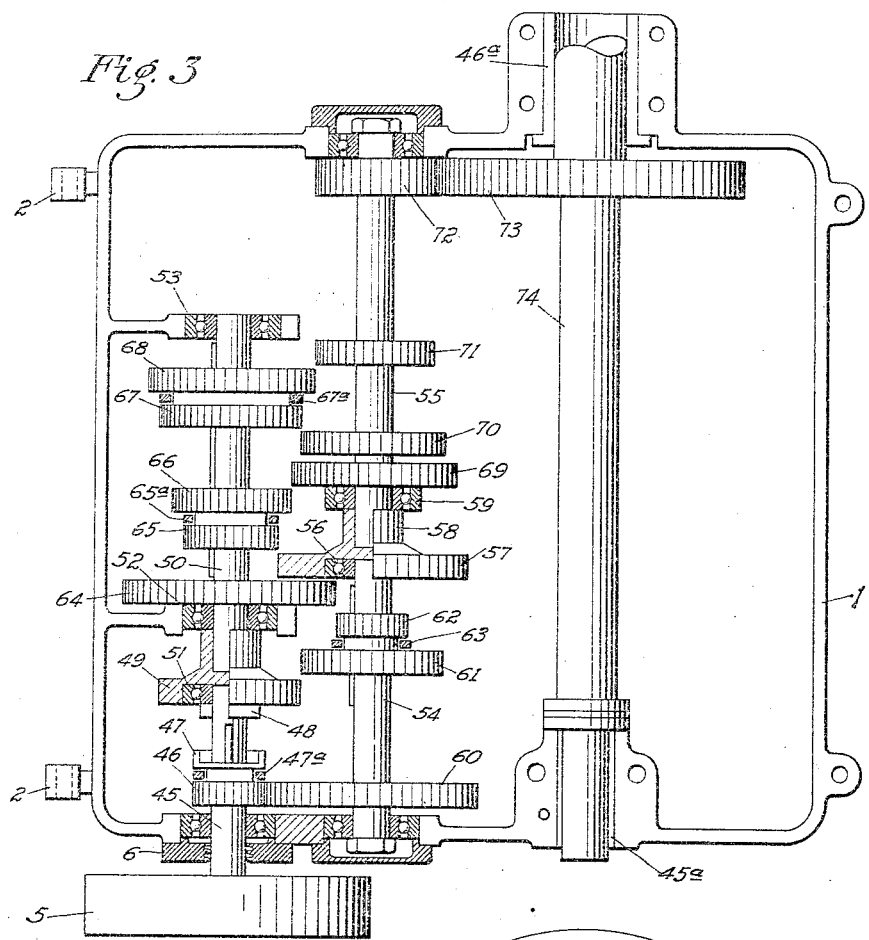
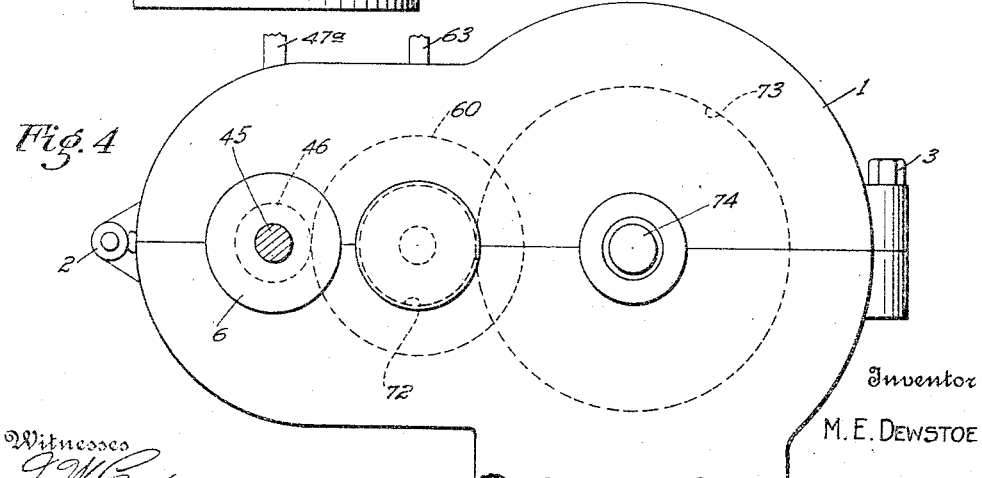

UNITED STATES PATENT OFFICE.

MARTIN E. DEWSTOE, OF BIRMINGHAM, ALABAMA.

VARIABLE-SPEED-GEAR DRIVING MECHANISM.

1,158,990.
Specification of Letters Patent. Patented Nov. 2, 1915.

Application filed March 13, 1915. Serial No. 14,142.

*To all whom it may concern:*

Be it known that I, MARTIN E. DEWSTOE, a citizen of the United States of America, residing at Birmingham, in the county of Jefferson and State of Alabama, have invented certain new and useful Improvements in Variable-Speed-Gear Driving Mechanism, of which the following is a specification.

My invention relates to a gear speed changing mechanism for engine and turret lathes, and machine tools, and its objects are to obtain an increased number of speeds without materially increasing the number of gears; to avoid absolutely the use of friction clutches or tumbler gears in the head; to avoid the use of jaw clutches as far as possible; to have only the gears that are doing the actual driving in mesh; to avoid the use of loose gears and drive all gears by keys; to avoid high peripheral speed of gearing and reduce to the minimum the number of gears in mesh to obtain any desired speed drive; to make all parts accessible for repair by arranging the gears on shafts having their center lines all in the same plane; to obtain a low cost of manufacture and maintenance by using short shafts and providing simple oiling facilities; and by making all speeds selective so that any desired speed can be obtained directly and without reference to any other speed, *i. e.*, without passing through any other gears.

One distinguishing characteristic of my gear mechanism is the provision of a countershaft carrying a cone of gears, which are preferably selective, and which is adapted to be driven by a sliding clutch gear adapted to engage a clutch driven by or on the primary power shaft so that the countershaft and its gears can be wholly disconnected from the drive. This arrangement permits me to pass the slower range of speed drives through the countershaft and to shunt the countershaft for the higher speed drives, thereby maintaining always a minimum number of gears in motion and having only those actually driving in mesh.

My invention further comprises many other novel features of construction, design and arrangement which may be understood by those skilled in the art by reference to several selected speed changing gear mechanisms which are illustrative of the principles underlying my invention.

Referring to the drawings:—Figure 1 is a plan view of the gear box more particularly designed for driving engine lathes. Fig. 2 is an end elevation of Fig. 1 with a pulley shaft shown in section. Fig. 3 is a plan view of the gear speed changing mechanism as adapted for driving turret lathes. Fig. 4 is an end elevation of Fig. 3.

Similar reference numerals refer to similar parts throughout the drawings.

Referring to the construction shown in Figs. 1 and 2, and which is particularly adapted for engine lathes, I show the speed changing gear mechanism mounted in a gear box 1 which is divided in a horizontal plane into sections hinged at one side on the hinge pin 2 and made fast at the other side by bolts 3 or other suitable fastening means. The bearings for the several gear shafts and the spindle have their centers in the line of the horizontal division of the gear box, as will be seen by reference to Fig. 2, so that, by raising the top section of the box, any shaft and its gears can be lifted out and its bearings inspected, repaired or conveniently oiled. The primary or drive shaft 4, having a pulley 5 mounted thereon, extends through a suitable dust protector 6 and bearing 7 into the gear box, and its inner reduced end has a bearing in a chamber formed in the center of a gear wheel 8 which is fast on the countershaft 9. This countershaft 9 is provided with suitable bearings 10 and 11 which are in alinement with the bearing 7 so that the short shafts 4 and 9 stand end to end and have a common center line. Upon the drive shaft 4, I mount a cone of selective driving gears 12, 13 and 14, which slide on the shaft and are driven therewith by a key 15. The gears 12 and 13 are preferably formed integral and are shifted by a lever yoke 16. The gear 14 has a collar 17 integral therewith and grooved to receive a lever yoke 18. A lever 19 controls these yokes and the selective manipulation of the cone of gears. I provide an intermediate shaft formed by two sections 20 and 21, the section 20 being mounted at one end in a bearing 22 in the gear box and having its inner end mounted in a bearing 23 formed in the gear wheel 24 that is fast on the shaft section 21. These shaft sections have a common center line and shaft 21 is supported by an intermediate bearing 25 and an end bearing 26. Suitable caps 27 are provided to cover these outer end bearings and upon shaft 20 I key a cone of gears 28, 29 and 30, which are adapted respectively to mesh with the gears 12, 13 and 14 on the drive shaft. Shaft 20 also carries a small clutch gear 31 adapted to mesh with gear 8 on the countershaft 9 and being slidable on the shaft 20 under the control of a yoke 32. This gear has a jaw clutch member 33 preferably formed integral therewith. A mating jaw clutch member 34 is formed integral with the clutch gear 24 on shaft 21 and is so positioned relatively to the gear 31 and clutch member 33 that when the clutch members are in mesh the gear 31 is out of mesh with the gear 8 and the countershaft 9 is not driven. Upon this countershaft I key a cone of selective gears, in this arrangement two gears 35 and 36 being provided and preferably formed integrally so as to be controlled by the lever yoke 37 and moved thereby along the countershaft to respectively engage the gear 24 or the gear 38 on shaft 21. These latter gears being keyed to the shaft 21 will drive that shaft and with it large and small selective gears 39 and 40, which are keyed to this shaft and free to slide thereon, under control of a yoke lever 41, to respectively mesh with gears 42 and 43 fast on the main spindle 44. Suitable end bearings 45ª and 46ª are provided for the spindle in the gear box.

Assuming the gears in the position shown in Fig. 1, the variable speed drives for the spindle 44 may be obtained by the selective manipulation of the gears on the driving shaft, the countershaft and the intermediate shaft. To illustrate, assuming the following gears in mesh, 12, 28, 31, 8, 36, 38, 40 and 43, the spindle is driven at the slowest speed and it will be noted only those gears which are actually driving are in mesh. Assuming the following parts in mesh, gears 14 and 30, the jaw clutch members 33 and 34, gears 39 and 42, the spindle will be driven at its highest speed and the countershaft is not rotated. I get three primary or high speeds by the selective manipulation of the gears 12, 13 and 14 on the drive shaft and driving through the clutch and gears 39 and 42. By shifting the drive through gears 31, 8, and either gears 35, or 36, I make a run of the nine faster speeds through the gears 39 and 42. The run of the nine slower speeds is secured in the same way except that the final drive is from gear 40 to gear 43. With sixteen gears I obtain eighteen different speeds and the center lines of all the gears lie in the same plane.

Referring to Fig. 3, the main drive shaft 45 has keyed to slide thereon a clutch gear 46 having integral therewith clutch jaws 47 adapted to mesh with a mating clutch jaw 48 integral with a gear 49 keyed fast to a shaft 50 which in this arrangement forms an auxiliary drive shaft that is disposed end to end and in alinement with the primary drive shaft 45 and is adapted to be connected to or disconnected from the said primary drive shaft through the clutch. The shaft 45 has its inner bearing 51 in the gear wheel 49 and the shaft 50 has bearings 52 and 53 mounted in webs in the gear box. The countershaft 54 in this arrangement is disposed in alinement with the intermediate shaft 55 and has its inner end mounted in a bearing 56 in the gear wheel 57 fast on the intermediate shaft and provided with a hub 58 which extends to and engages the inner bearing 59 for the intermediate shaft. Upon the countershaft 54 is keyed a large gear 60 which is adapted to mesh with the sliding clutch gear 46 when the clutch is open. The countershaft 54 also carries two selective gears 61 and 62 which are keyed thereto and slidable thereon under the control of the yoke lever 63. The gears 61 and 62 are adapted respectively to mesh with the gears 49 and 64 on the auxiliary driving shaft 50 upon which is also keyed a cone of selective sliding gears 65, 66, 67 and 68 which are adapted to mesh respectively with the gears 57, 69, 70 and 71 keyed on the intermediate shaft. The drive from shaft 55 is through gears 72 and 73 to the spindle 74. In this construction also the several shafts have their common center lines in the plane of the horizontal division line of the gear box. With this arrangement of gears twelve speeds are obtained and only the gears which are actually doing the driving are in mesh. To illustrate, the slowest speed is derived through the following series of meshing gears, namely, 46, 60, 62, 64, 65, 57, 72 and 73. The highest speed is obtained through throwing in the clutch to connect the auxiliary driven shaft to shaft 45 and drive through gears 68, 71, 72 and 73. It will be noted that in this arrangement the countershaft 54 is disconnected. When the jaw clutch is thrown in to drive the auxiliary drive shaft 50 direct, we obtain the four fast speeds according to whether we use the gear 65, 66, 67, or 68 to drive the intermediate shaft 55. The four intermediate speeds are obtained by opening the clutch and driving the auxiliary drive shaft through gears 46, 60, 61 and 49, the four speeds being determined by the selective manipulation of the cone of gears on auxiliary drive shaft. The four lowest speeds are obtained by opening the clutch and driving through gears 46, 60, 62 and 64 to the auxiliary drive shaft. One object of the arrangement shown in this figure is that the clutch is on the shaft of lowest speed to make easier its operation, it being often true in the gear drive for turret lathes that the primary shaft revolves more slowly than the intermediate shaft 55 which is the shaft that carries the clutch in Fig. 1 and which is in that design the slowest moving shaft.

The advantage of the arrangement of the countershaft with the clutch gear means for drawing it into and out of the drive, may be obtained with other arrangements of the countershaft than those shown, it being my purpose to illustrate in the two designs shown the principles of construction by means of which I am enabled to obtain the advantages in construction and operation hereinbefore pointed out. The characteristic feature of the various arrangements is that the countershaft shall be always driven by a gear movable with the movable clutch element and rotatable therewith.

Having thus described my invention, what I claim as new and desire to secure by Letters Patent, is:—

1. In a variable speed gear driving means, in combination, a plurality of selective driving gears, a spindle, a countershaft having a plurality of gears thereon, selective gearing adapted to transmit different speed drives from said gears on the countershaft to the spindle, and a clutch and gear adapted to control the driving connection through the selective driving gears either directly to the spindle, leaving the countershaft idle, or indirectly through the countershaft to the spindle.

2. In a variable speed gear drive, a drive shaft, a countershaft, a spindle, a train of gearing connecting the countershaft and spindle, a plurality of selective gears, a train of gearing for driving through said selective gears direct to the spindle, and a movable clutch and gear means to disconnect the countershaft from the drive under direct driving conditions for the spindle and to connect the countershaft to the drive under indirect driving conditions, substantially as described.

3. In a variable speed gear drive, a countershaft, a spindle, a train of gearing connecting the countershaft and spindle, a plurality of selective gears, a train of gearing for driving through said selective gears direct to the spindle, clutch means interposed in said latter train of gearing, and a sliding gear movable with the clutch and adapted to connect the drive shaft and countershaft under indirect driving connections for the spindle and to disconnect the countershaft under direct driving conditions for the spindle, all countershaft gears and gearing meshing therewith, being disconnected from the rotating driving gears under direct driving conditions.

4. In a variable speed gear driving mechanism, the combination with a series of selective sliding gears, a shaft support therefor and a driven spindle, of a countershaft which has mounted thereon selective sliding gears, a gear having a jaw clutch on end of same, said clutch gear being adapted to drive the countershaft, a gear driving means between the countershaft and spindle, a mating clutch adapted to mesh with the clutch gear when said gear is withdrawn from operative connection with gearing on the countershaft which then does not rotate, and means driven by said mating clutch member to drive said spindle through said selective gear series and the clutch.

5. In a variable speed gear drive for a spindle, a plurality of selective gears, a countershaft having gears thereon for driving at different speeds, a gear and a clutch member connected to said gear which is adapted to mesh with and drive a gear on the countershaft, a mating clutch member, an intermediate shaft, gears thereon adapted to be driven by said mating clutch member or by said countershaft gears to transmit motion to the spindle, and means to shift said clutch and connected gear to drive direct through the selective gearing and through the clutch to the spindle, leaving the countershaft still, said gear and clutch, when the clutch is open, being adapted to drive through the variable speed gearing on the countershaft to the spindle, substantially as described.

6. In a variable speed gear driving mechanism, a series of three or more selective sliding gears, a shaft therefor, a countershaft having a number of variable speed driving gears thereon, a gear having a clutch member rotatable therewith and which is adapted to mesh with or be disconnected from a gear on the countershaft, a mating clutch member and gearing driven thereby, a spindle, and gearing adapted to connect or disconnect said spindle from the countershaft, the gear mechanism being so arranged that when the clutch members are disengaged and the clutch gear is in mesh with a gear on the countershaft, the drive to the spindle is through one of the selective series of gears and the countershaft, and when the clutch members are interlocked and the clutch gear disconnected from the countershaft, the drive to the spindle is through one of the selective series of gears and clutch.

7. In a variable speed gear drive mechanism, in combination, a drive shafting, intermediate shafting, countershafting and a spindle, said shafting having their center lines in the same plane, a gear box divided on the planes of said center lines, and selective variable speed driving gearing mounted on said shaftings and spindle, substantially as described.

8. In a variable speed gear drive mechanism, in combination, a drive shafting, intermediate shafting, countershafting and a spindle, said shaftings and spindle having their center lines in the same plane, a gear box divided on the planes of said center lines, and selective variable speed driving gearing mounted on said shaftings and spindle, substantially as described.

9. In a variable speed gear drive mechanism, in combination, a drive shaft, an intermediate shaft, a countershaft and a spindle, gears for transmitting motion through two or more of said shafts to the spindle, one of said shafts being divided into gear bearing sections, and a clutch gear mounted on each section and having jaws adapted to mesh and drive direct through the shaft sections to the spindle, and a gear on the countershaft adapted to mesh with a movable clutch gear to drive through the countershaft to the spindle, substantially as described.

10. In a variable speed gear drive mechanism, in combination, a drive shaft, a countershaft, an intermediate shafting formed of two sections, clutch means to connect and disconnect said sections, a selective gearing for transmitting motion from the drive shaft to one section of the intermediate shafting, selective mechanism for transmitting different speed drives from the countershaft to the other section of the intermediate shafting, a driving gear for the countershaft, a gear slidable with one of the clutch elements and adapted to mesh with said driving gear and transmit motion through the countershaft from one to the other section of the intermediate shafting, and a gear drive from the last mentioned intermediate shafting section to the spindle.

11. In a variable speed gear drive mechanism, in combination, a drive shaft, a countershaft, intermediate shafting formed of two sections, clutch means to connect and disconnect said sections, a selective gearing for transmitting motion from the drive shaft to one section of the intermediate shafting, selective mechanism for transmitting different speed drives from the countershaft to the other section of the intermediate shafting, a gear slidable with one of the clutch elements and a meshing gear adapted to transmit motion through the countershaft from one to the other section of the intermediate shafting, and a selective two speed gear drive between said latter shaft and the spindle.

12. In a variable speed gear drive mechanism, in combination, a gear box, a plurality of gear shafts and a spindle mounted therein, the gear shafts being formed in short sections and arranged in one or more pairs end to end with a common center line for each pair, a variable speed selective driving gearing distributed over said shafts and adapted to be manipulated to drive the spindle at varying speeds, a jaw clutch connection between the abutting ends of a pair of said shafts, and gearing movable into mesh as the clutch is opened and adapted when the clutch is open to transmit motion indirectly through an otherwise undriven shaft from one to the other of said abutting shaft sections, substantially as described.

13. In a variable speed gear drive mechanism, a drive shaft, three transmission shafts, a spindle, selective gearing distributed over said shafts and spindle for driving the latter at varying speeds, said shafts extending only partway through the box and arranged in pairs end to end having common center lines, an intermediate bearing for one shaft of each pair, a gear fixed on the inner end of said shaft of each pair and provided with a bearing to receive and support the inner end of its respective alining shaft, a clutch interposed between two abutting shaft sections, and means controlled by the clutch to drive either directly from the power shaft through two of the other shafts to the spindle, or indirectly through the three shafts to the spindle, substantially as described.

14. In combination, a gear box divided in halves, a plurality of alining pairs of shafts mounted in the gear box, a gear fast on the inner end of a shaft of each pair, an inner bearing for each such gear bearing shafts, a bearing in the said gears to support the inner ends of the other shaft of their respective pairs, and changeable speed gears keyed on said shafts and selectively movable to drive a spindle at varying speeds.

15. In combination, a gear box divided in halves, a plurality of alining pairs of shafts and a spindle mounted with their center lines on the line of division of the gear box, a gear fast on the inner end of a shaft of each pair, an inner bearing for each such gear bearing shafts, an antifriction shaft bearing on each of said gears and adapted to receive and support the inner end of the other shaft of each pair, two or more cones of selective gears keyed on said shafts, and meshing gears for the transmission of selected varying speeds to the spindle.

In testimony whereof I affix my signature in presence of two witnesses.

MARTIN E. DEWSTOE.

Witnesses:
NOMIE WELSH,
R. D. JOHNSTON, Jr.